(12) United States Patent
Castorina et al.

(10) Patent No.: US 7,106,913 B2
(45) Date of Patent: Sep. 12, 2006

(54) METHOD FOR MERGING DIGITAL IMAGES TO OBTAIN A HIGH DYNAMIC RANGE DIGITAL IMAGE

(75) Inventors: Alfio Castorina, Linera-Catania (IT); Massimo Mancuso, Monza-Milano (IT); Sebastiano Battiato, ACI Catena-Catania (IT)

(73) Assignee: STMicroelectronics S. r. l., Agrate Brianza (IT)

( * ) Notice: Subject to any disclaimer, the term of this patent is extended or adjusted under 35 U.S.C. 154(b) by 716 days.

(21) Appl. No.: 10/300,663

(22) Filed: Nov. 19, 2002

(65) Prior Publication Data

US 2003/0128893 A1    Jul. 10, 2003

(30) Foreign Application Priority Data

Nov. 19, 2001    (EP) .................................. 01830713

(51) Int. Cl.
*G06K 9/40*    (2006.01)

(52) U.S. Cl. ..................... 382/284; 382/294; 345/629

(58) Field of Classification Search ............... 382/284, 382/294, 254; 345/629, 418, 428
See application file for complete search history.

(56) References Cited

U.S. PATENT DOCUMENTS

| | | | |
|---|---|---|---|
| 5,517,242 A | 5/1996 | Yamada et al. | |
| 5,828,793 A | 10/1998 | Mann | |
| 6,577,312 B1 * | 6/2003 | Deering et al. | 345/428 |
| 6,664,955 B1 * | 12/2003 | Deering | 345/418 |
| 6,744,931 B1 * | 6/2004 | Komiya et al. | 382/284 |
| 6,990,249 B1 * | 1/2006 | Nomura | 382/254 |

FOREIGN PATENT DOCUMENTS

EP    0 609 592 A1    10/1994

OTHER PUBLICATIONS

European Search Report, Oct. 30, 2002.
Steve Mann, "Comparametric Equations with Practical Applications in Quantigraphic Image Processing", IEEE Transactions on Image Processing, vol. 9, No. 8, Aug. 2000.

* cited by examiner

*Primary Examiner*—Sanjiv Shah
(74) *Attorney, Agent, or Firm*—Lisa K. Jorgenson; Bryan A. Santarelli; Graybeal Jackson Haley LLP

(57) ABSTRACT

A method of processing digital source images, each represented by pixel matrices, to obtain from two or more source images, representing one and the same real scene and acquired by utilizing different exposure levels, a final digital image capable of reproducing the real scene with an exposure latitude greater than that of each of the source images. The method, which can be advantageously used in digital still cameras, produces the final image by combining the source images with the help of a weighted average constructed pixel by pixel. Thanks to a special filtering to which the weighting coefficients are subjected before the weighted mean operation, the method obtains a final image in which the source images are harmoniously combined with each other.

27 Claims, 3 Drawing Sheets

| G | R | G | R | G | R |
|---|---|---|---|---|---|
| B | G | B | G | B | G |
| G | R | G | R | G | R |
| B | G | B | G | B | G |
| G | R | G | R | G | R |
| B | G | B | G | B | G |

*Fig. 3*

METHOD FOR MERGING DIGITAL IMAGES TO OBTAIN A HIGH DYNAMIC RANGE DIGITAL IMAGE

CROSS-REFERENCE TO RELATED APPLICATIONS

The present application claims priority from European patent application No. 01830713.2, filed Nov. 19, 2001, which is incorporated by reference.

TECHNICAL FIELD

The present invention generally concerns the acquisition and processing of images in digital format and, more particularly, a method that can be advantageously used in digital still cameras, where, combining several images representative of one and the same real scene, the method generates a final image of a quality superior to that of the source or input images.

BACKGROUND OF THE INVENTION

The digital still camera, often referred to by the abbreviation DSC, is at present one of the most common devices employed for acquiring digital images. The fact that both sensors of ever greater resolution and low-priced digital signal processors (DSPs) of low power consumption are readily available in commerce has led to the development of digital still cameras capable of acquiring images of very high resolution and quality.

Just like their traditional counterparts, however, these cameras still have a rather limited response when it comes to acquiring real scenes containing zones differing from each other by considerable illumination contrasts.

The sensitivity of an image-acquisition instrument to the light-intensity variations contained in a given scene is measured in terms of exposure latitude or dynamic range. This parameter represents the greatest ratio between the maximum and the minimum light intensity contained in the given scene to which the instrument is capable of responding.

The dynamic range of a digital still camera is determined by the characteristics of the sensor and by the format of the data after the analog/digital conversion.

The sensor, no matter whether it is of the CCD or the CMOS type, is an integrated device comprising a matrix of photosensitive cells, each of which provides an output voltage proportional to the quantity of light that strikes it during the acquisition time.

The curve representing the response of a photosensitive cell to the quantity of incident light consists of a threshold region, a saturation region and a linear region comprised between the threshold region and the saturation region (FIG. 2a).

The threshold region, which corresponds to the tract 6 of the curve shown in FIG. 2a, is characterized by the fact that in this region the photoelectric cell produces either very small or zero variations of its output voltage in response to variations of the quantity of incident light. It is therefore essential that during the acquisition time there should be present a minimum (threshold) quantity of incident light (or photons) to generate an output voltage that prevails over the noise voltage, a part of which will be present in the output even when there is no incident light at all.

The saturation region, which corresponds to the tract 8 of the curve in FIG. 2a, is characterized by the fact that whenever an excessive quantity of photons strikes the cell during the acquisition time, as from a certain point onwards even a substantial increment of the number of incident photons will produce only a minimal or zero increase of the output voltage.

Since the response of each individual light-sensitive element is limited, the sensor introduces a first substantial limitation of the response capacity of the still camera to variations of the light intensity.

Just as in the case of traditional still cameras, control of the exposure, obtained by acting both on the size of the diaphragm opening and the shutter timing, makes it possible to regulate the quantity of light that strikes the sensor during acquisition. But when the radiance variation of the scene, i.e., the quantity of light the scene emits per unit area, is too great, even the best regulation of the exposure will not prevent the acquisition of an image with a part of the cells below the threshold or with a part of the cells in saturation or, in the worst case, with the contemporary presence of cells in saturation and cells below the threshold.

On the output side of the sensor, the voltage values generated by each cell are translated into digital values by an analog/digital converter.

The overall memory quantity that the formats most commonly employed for storing digital images utilize for each pixel amounts to 24 bits, of which, eight are reserved for luminosity information (corresponding to 256 possible distinct brightness levels).

The conversion of the voltage values from the analog form to the digital form introduces an error, the so-called quantization noise, derived from the fact that this conversion implies a passage from an infinite number of shadings to a finite number of levels. This process further accentuates the loss of information for the pixels codified with digital values in the neighbourhood of the two extremes of the scale (0 and 255), where small variations of light intensity may become completely cancelled.

The combined effect derived from these facts is that whenever the real scene is characterized by the presence of considerable variations of light intensity, which may be due, for example, to the simultaneous presence of both shadow areas and reflecting surfaces, the image acquired with the digital still camera will suffer a loss of detail. All the regions of the image characterized by high luminosity (reflecting surfaces) will be affected by visible saturation effects, while the regions of very low luminosity (shadow zones) will become uniformly codified with an intensity value "0" or values close to "0".

Present-day digital still cameras either incorporate automatic gain control (AGC) systems that assure automatic regulation of the sensitivity of the light-sensitive elements or, alternatively, incorporate automatic exposure setting systems that operate in conformity with a multitude of different criteria. Yet another alternative is represented by the possibility of manually regulating the exposure level.

These expedients make it possible to exploit the response of the still camera in an optimal manner or enable the operator to select the part of the real scene that is to be acquired with the greatest amount of detail, but cannot enlarge the dynamic range of the still camera.

The prior art also comprises a technique that employs a combination of a set of images, all representing one and the same real scene but acquired with different exposures, to obtain a final image of a higher quality.

This technique is based on the consideration that the details that would be lost if the scene were to be acquired with a single exposure can be correctly recorded by employing a series of images acquired with different exposures and then selecting from them the particular portions that in each image are reproduced in an optimal manner.

The methods that utilize this technique are based either on the determination of the response function of the still camera or on the determination of the "radiance maps" as the means for obtaining the information needed for selecting regions of the various images and then automatically combining them.

In particular, U.S. Pat. No. 5,828,793 (Mann) describes a method of combining images that consists of determining the response function of the still camera and combining the source images by constructing a weighted average of these images pixel by pixel. The weighting coefficients used for the weighted average are calculated on the basis of the response function.

Although the method proposed by Mann is capable of identifying the best-exposed portions of the source images, in the combination of the various images it produces visible artifacts due to the sudden passage from one image to the other.

SUMMARY OF THE INVENTION

One aspect of the present invention is, therefore, to produce a final image of better quality and with greater detail and to assure an absence of such artifacts by using a simple procedure to combine several images obtained by exposing the same real scene in different ways.

According to an embodiment of the invention, a method of merging digital images is provided.

BRIEF DESCRIPTION OF THE DRAWINGS

The invention will be understood more readily from the detailed description given below of a particular embodiment, the said embodiment being merely an example and should not therefore be regarded as in any way limitative, together with the accompanying drawings, of which:

FIG. 3 shows the layout pattern of the filtering elements in a filter for a sensor of the Bayer type in accordance with an embodiment of the invention.

DETAILED DESCRIPTION

The following discussion is presented to enable a person skilled in the art to make and use the invention. The general principles described herein may be applied to embodiments and applications, other than those detailed below without departing from the spirit and scope of the present invention. The present invention is not intended to be limited to the embodiments shown, but is to be accorded the widest scope consistent with the principles and features disclosed or suggested herein.

Figure 1:
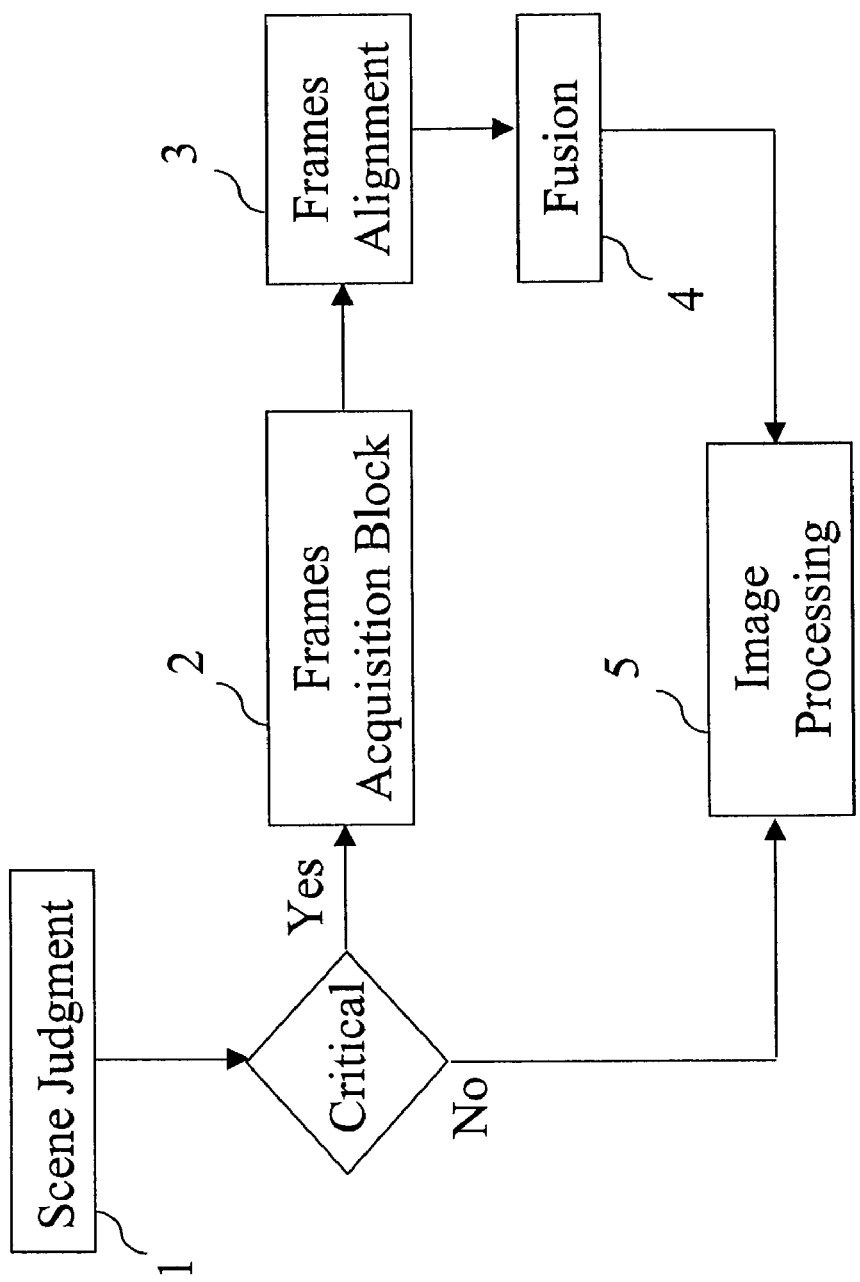
FIG. 1 shows the logic scheme in the form of a block diagram of an acquisition system that utilizes the method in accordance with an embodiment of the invention.

As can be seen from FIG. 1, a system that applies the method in accordance with the an embodiment of the invention includes four principal logic blocks. A non-reductive assumption for the purposes of the description is to suppose initially that the system shown in FIG. 1 acquires and processes monochromatic images, for example, in a gray scale represented by means of pixels digitized with N=8 bits.

Block 1 analyzes the scene at a point that in a digital still camera could be, for example, at the output of the sensor (not shown) and, applying an algorithm of a type known to a person skilled in the art, decides whether or not the scene is critical in terms of exposure.

If the scene is not critical, it will be acquired in accordance with known techniques and the acquired image is then passed to Block 5 (Image Processing).

For critical scenes, on the other hand, the system utilizes a new operating mode. In particular, Block 2 (Frame Acquisition Block) acquires two or more images, using different exposure settings for each image. In this way, each of the images will show different details of the scene, for example, images acquired with a brief exposure will best reproduce the bright details of the scene.

Obviously, small movements of the acquisition system during the acquisition of the different images will produce significant misalignments of these images. Block 3 (Frames Alignment Block) assures correct realignment of the images. This is done by means of techniques that form part of the prior art.

Once the scenes have been acquired and aligned, Block 4 (Fusion) applies a merging method according to an embodiment of the present invention.

The acquired images are combined with each other, pixel by pixel. Each pixel of the final image is obtained by forming a weighted average of the corresponding pixels forming part of all the individual source images. For example, the pixels of the final image are substantially obtained in accordance with the following formula:

$$\overline{p_f}(x, y) = \frac{\sum_{i=1}^{n} w_i(x, y) \overline{p_i}(x, y)}{\sum_{i=1}^{n} w_i(x, y)}$$

where $\overline{p_f}(x,y)$ is the pixel having the coordinates (x, y) in the final image, $\overline{p_1}(x,y), \ldots, \overline{p_n}(x, y)$ are the corresponding pixels forming part, respectively, of the source images $1, \ldots, n$, and $w_1(x,y), \ldots, w_n(x,y)$ are the weighting coefficients associated, respectively, with the said pixels.

To this end, appropriate weight determination functions are used to associate a weighting coefficient (or weight) with each pixel of the source images.

Figure 2A:
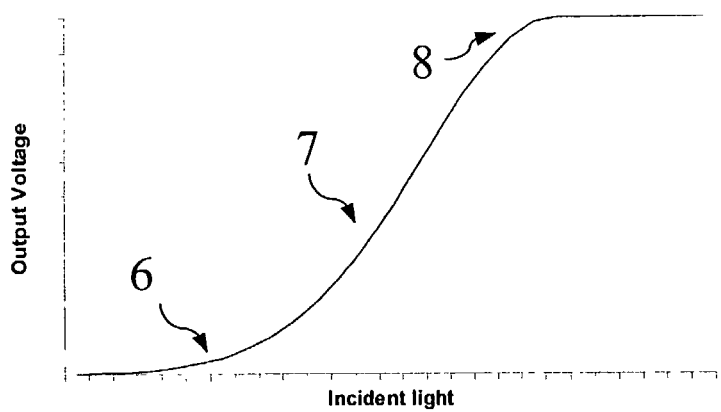
FIG. 2a shows the response curve of a photoelectric cell in accordance with an embodiment of the invention.
Figure 2B:
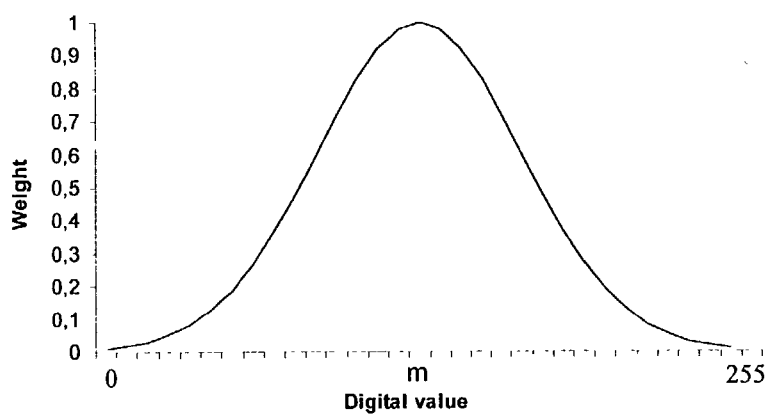
FIG. 2b shows a weighting function of the Gaussian type centered around a digital value m in accordance with an embodiment of the invention.

For example, when it is desired to have a final image with a certain average gray level m (which is usually close to a value codified with $2^{N-1}=128$, where N=8 is the number of bits used to digitize the pixel), a single Gaussian weighting function of the type:

$$w(x, y) = e^{-\frac{(l(x,y)-m)2}{\sigma^2}}$$

where $l(x,y)$ is the digital value of the pixel having the coordinates (x,y) and $\sigma^2$ is the variance of the curve (FIG. 2b), can be used for all the source images.

Figure 2C:
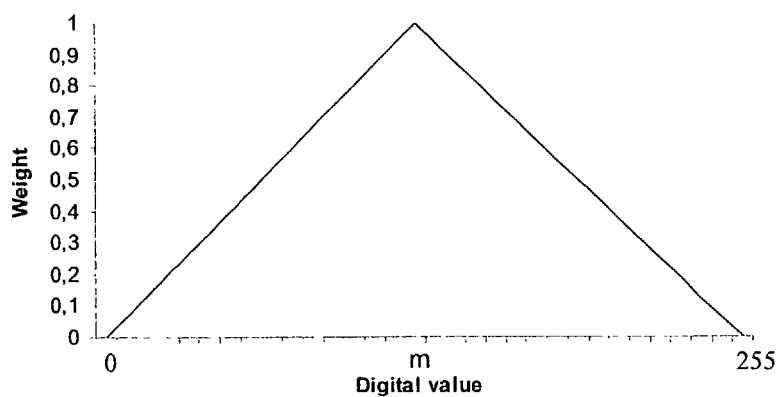
FIG. 2c shows a weighting function of the triangular type centered around a digital value m in accordance with an embodiment of the invention.

A triangular function centered around m can be used in an analogous manner (FIG. 2c).

Both these functions have the effect of associating a higher weighting coefficient with the pixels having a value close to m.

The idea underlying the choice of these weighting functions is to consider the pixels codified with values close to the central values of the dynamic output range as more significant of an image, this on account of the fact that they are far removed from the values of the threshold or saturation regions in the response curves.

Alternatively, the various images can also be weighted with functions of the same type but centered around values that differ from each other rather than using a function of the same weight for all the images.

A possible choice is that of centering the weighting function (be it Gaussian or triangular) for the i-th image around the value $m_i = X_{MAX} - mean_i$, where $mean_i$ represents the average gray level of the i-th image and $X_{MAX} = 2^{N-1} = 255$ is the digital value corresponding to saturation.

This choice makes it possible to polarize the distribution of the weights: for example, in overexposed images, i.e. images in which $mean_i$ tends towards the saturation value (255), the pixels with modest gray levels are attributed substantially greater weights.

Independently of the type of weighting function employed, if the starting images were to be combined by using the weights calculated as explained above, the sudden passage from one image to another would be noticeable in the final image. Hence unpleasant artifacts would be visible in the final image.

A more homogeneous merging of the source images can be obtained by filtering the weights in such a way as to produce a more gradual distribution of the weights within each image (smoothing).

To accomplish this filtering, the weight w(x,y) of the pixel having the coordinates (x,y) is modified by including in it the contribution of the weights of the pixels forming part of a given neighborhood around the pixel (x,y).

For example, a filter suitable for this purpose would be a Gaussian filter G with a space constant c given by:

$$G(x, y) = e^{-\frac{x^2+y^2}{c^2}}.$$

When this filter is applied to the weight w(x,y), the latter is transformed in such a way as to include in it the contribution of all the weights of the pixels situated in a neighborhood having its center at (x,y) and a radius of c.

Experimental trials have shown that if acceptable results are to be obtained, the filtering is typically carried out with a large value of the space constant c, which typically amounts to at least one tenth of the smallest dimension of the image. For example, a final image of poor resolution, in format 640×480, would typically require the weights of each source image to include the weights of the pixels situated within a neighborhood having a radius of 48 pixels.

But this would typically imply unacceptable computation times in a practical implementation.

According to an embodiment of the present invention, this difficulty can be overcome by selecting in each source image only a small part of the weights (1/10 or 1/100, for example) distributed in a substantially uniform manner (for example, on a grid) over the pixel matrix and then filtering only this part.

Using an appropriate interpolation procedure, of the bilinear type, for example, from the selected and filtered weights, one can then obtain estimates of the filtered weighting coefficients also for the pixels of which the weights were not selected for filtering. This operation is known as expansion by interpolation and, in actual fact, constitutes a local approximation.

The weights effectively utilized for merging the images are obtained by linearly combining the calculated weighting coefficients and their filtered counterparts, for example, to include also a small contribution of the non-filtered original weighting coefficients.

Processing the images in this manner, it becomes possible to avoid the artifacts and to produce a final image that contains a harmonious combination of the best parts of the source images.

The procedure may be extended in a very simple manner to the case in which the source images are colored, in RGB format, for example, by determining the initial, filtered, and final weighting coefficients in accordance with the method explained above only for the achromatic luminance channel Y and then using the final weights obtained in this manner for separately combining the various coloured bands R,G,B.

The achromatic luminance channel Y can be obtained from an RGB image by linearly combining the components R,G,B on the basis of the following identity:

$Y=0.299R+0.587G+0.114B.$

Furthermore, the method in accordance with an embodiment of the invention lends itself very advantageously to being applied directly to digital images in CFA (Color Filter Array) format with which the digital images are acquired by the sensor.

In the sensors commonly employed in digital still cameras, each pixel has associated with it just a single light-sensitive cell, so that only a single item of information can be provided about the intensity of the incident light. The sensor is covered by an optical filter consisting of a matrix of filtering elements, each one of which is situated in the position of a particular photoelectric cell. Each filtering element transmits to the photoelectric cell associated with it the luminous radiation (of which it absorbs only a minimal part) corresponding to the wavelength of nothing other than red light, nothing other than green light, or nothing other than blue light, so that for each pixel it reveals just a single component: the red component, the green component, or the blue component.

The output image of the sensor, after conversion into digital format, is an incomplete digital image, because it consists of only a single component (R, G or B) for each pixel. The format of this image is conventionally known as CFA (Color Filter Array).

The type of filter varies from one manufacturer to another; the one most commonly employed is known as Bayer filter. In this filter, the arrangement of the filter elements, the so-called Bayer pattern, is identified by the basic matrix reproduced in FIG. 3.

With this type of filter the green component (G) is revealed by half the pixels of the sensor, which are arranged in the manner of the dark-coloured squares of a chessboard pattern; the other two components are revealed by the remaining pixels and arranged, respectively, on the light-coloured squares of alternate lines.

Starting from the CFA image and using an interpolation process, digital still cameras will generally generate a complete RGB digital image in which each pixel is associated with a set of three components that correspond to the three primary components Red, Green and Blue of additive chromatic synthesis.

The digitization of an RGB image requires three times as much memory space as a corresponding CFA image.

If the source images are of high resolution or are very numerous, the application of the interpolation process to each of them and the subsequent storing in memory of these images before the combination operation is undertaken may therefore prove computationally very onerous.

Subject to appropriate adjustments, the proposed combination method can be applied directly to images in CFA format: the first step is to calculate the initial, filtered and final weighting coefficients solely for the green pixels or for a subset of these pixels, which are the most numerous and, taken as a whole and from the physical point of view, approximate the achromatic luminance channel Y. The computation of the initial, filtered and final weighting coefficients associated with the green pixels is carried out in accordance with the embodiment of the method described above for the monochromatic images.

Starting from the weights of the green pixels, one then obtains the weights for combining also the pixels of the other two colors. The initial (unfiltered) weights of the red or blue pixels are obtained, not by applying a weighting function to them, but rather by assigning to each blue or red pixel either the initial weight of one of the adjacent green pixels or some linear combination of the weights of these pixels (an average, for example).

The filtered weights of the red or blue pixels are obtained as local approximation by expanding the filtered weights of the green pixels with the help of an interpolation process.

The final weighting coefficients of the red and the blue pixels are then obtained as a linear combination of their initial and filtered weights.

Once a final weight has been assigned to each pixel, the images in CFA format can be combined by obtaining a weighted average for each pixel as if they were monochromatic images.

The proposed method according to an embodiment of the invention, therefore, makes it possible to avoid the interpolation of the source images: only the final image with an ample exposure latitude is subjected to this process, thus obtaining a considerable saving in terms of memory occupation, computation time, and energy consumption.

We claim:

1. A method of processing n digital source images that represent one and the same real scene and have been acquired with different exposure levels, the said images being made up of pixel matrices, each of which is represented by k components that are each associated with a digital value, for obtaining a final digital image with an ample exposure latitude, the method comprising the following sequence of operations:

aligning the source images, constructing a weighted average of the pixels corresponding to all the source images to obtain the corresponding pixels of the final image in accordance with the formula:

$$\overline{p_f}(x, y) = \frac{\sum_{i=1}^{n} w_i(x, y)\overline{p_i}(x, y)}{\sum_{i=1}^{n} w_i(x, y)}$$

where $\overline{p_f}(x,y)$ is the pixel having the coordinates $(x, y)$ in the final image, $\overline{p_1}(x,y), \ldots, \overline{p_n}(x,y)$ are the corresponding pixels forming part, respectively, of the source images $1, \ldots, n$, and $w_1(x,y), \ldots, w_n(x,y)$ are the weighting coefficients associated, respectively, with the said pixels, wherein the weighting coefficients are scalar values and are chosen in an interval of values comprised between a maximum coefficient and a minimum coefficient by carrying out the following sequence of operations:

selecting one and the same component for all the pixels of the source images, the said component being either chosen from among the k possible components or obtained from any linear combination of the said k components, assigning to each pixel of the source images an initial weighting coefficient based on the digital value of the selected component, by using for each image a weighting function that attributes weighting coefficients close to the minimum coefficient to digital values close or equal to the extremes of the range of possible digital values and gradually larger weighting coefficients to digital values forming part of the central regions of the range of possible digital values, selecting in each of the source images a grid that identifies a subset of pixels distributed in a substantially uniform manner over the pixel matrix, subjecting the initial weighting coefficients of the pixels forming part of each selected grid to at least one filtering operation capable of attenuating sudden variations among the initial weighting coefficients of pixels forming part of regions of an image situated close to each other, expanding the filtered weighting coefficients by means of interpolation to obtain estimated filtered weighting coefficients also for the pixels not forming part of the subset identified by the grid, constructing for each pixel a linear combination of the initial weighting coefficient and the filtered weighting coefficient and using the said linear combination as final weighting coefficient for the corresponding pixel of the final image.

2. A method in accordance with claim 1, wherein the weighting function is the same for all the source images.

3. A method in accordance with claim 1 wherein the source images are associated with different weighting functions of the same type, corresponding to translations of one and the same function of a quantity determined on the basis of the exposure condition of the images.

4. A method in accordance with claim 1 wherein the weighting function is of the Gaussian type.

5. A method in accordance with claim 1 wherein the weighting function is of the triangular type.

6. A method in accordance with claim 1 wherein the filtering of the weights is performed by means of a filter of the Gaussian type.

7. A method in accordance with claim 1 wherein the acquired images and the final image are monochromatic digital images in which k=1.

8. A method in accordance with claim 1 wherein k=3 and every pixel is a vector of three components that correspond to the primary optical components of the additive chromatic R,G,B synthesis and the component selected for the determination of the weights is the achromatic luminance channel Y obtainable from the linear combination of the components R,G,B in accordance with the formula:

$Y=0.299R+0.587G+0.114B.$

9. A method of processing n digital source images in CFA (Color Filter Array) format that represent one and the same real scene and have been acquired with different exposure levels, the said images being made up of pixel matrices, each of which is represented by a digital value that, on the basis of the position of the pixel, is associated with a chromatic component of the red type R or of the green type G or of the blue type B, for obtaining a final digital image in CFA format with an ample exposure latitude, the method comprising the following sequence of operations:

aligning the source images, constructing a weighted average of the pixels corresponding to all the source images to obtain the corresponding pixels of the final image in accordance with the formula:

$$\overline{p_f}(x, y) = \frac{\sum_{i=1}^{n} w_i(x, y)\overline{p_i}(x, y)}{\sum_{i=1}^{n} w_i(x, y)}$$

where $\overline{p_f}(x,y)$ is the pixel having the coordinates (x, y) in the final image, $\overline{p_1}(x,y), \ldots, \overline{p_n}(x,y)$ are the corresponding pixels forming part, respectively, of the source images 1, ..., n, and $w_1(x,y), \ldots, w_n(x,y)$ are the weighting coefficients associated, respectively, with the said pixels, wherein the weighting coefficients are scalar values and are chosen in an interval of values comprised between a maximum coefficient and a minimum coefficient by carrying out the following sequence of operations:

assigning to all the green pixels of the source images an initial weighting coefficient based on the digital value of the pixel, by using for each image a weighting function that attributes weighting coefficients close to the minimum coefficient to digital values close or equal to the extremes of the range of possible digital values and gradually larger weighting coefficients to digital values forming part of the central regions of the range of possible digital values, associating with the red pixels and the blue pixels an initial weighting coefficient that is either equal to the weighting coefficient of one of the adjacent green pixels or has been obtained from a linear combination of the weighting coefficients of the adjacent green pixels, selecting in each of the source images a grid that identifies a subset of pixels distributed in a substantially uniform manner over the pixel matrix, subjecting the initial weighting coefficients of the green pixels forming part of each selected grid to at least one filtering operation capable of attenuating sudden variations among the initial weighting coefficients of green pixels forming part of regions of an image situated close to each other, expanding the filtered weighting coefficients by means of interpolation to obtain estimated filtered weighting coefficients also for the green pixels not forming part of the subset identified by the grid, and for all the blue or red pixels, constructing for each pixel a linear combination of the initial weighting coefficient and the filtered weighting coefficient and using the said linear combination as final weighting coefficient for the corresponding pixel of the final image.

10. A method in accordance with claim 9 wherein the weighting function is the same for all the source images.

11. A method in accordance with claim 9 wherein the source images are associated with different weighting functions of the same type, or corresponding to translations of one and the same function of a quantity determined on the basis of the exposure condition of the images.

12. A method in accordance with claim 9 wherein the weighting function is of the Gaussian type.

13. A method in accordance with claim 9 wherein the weighting function is of the triangular type.

14. A method in accordance with claim 9 wherein the filtering of the weights is performed by means of a filter of the Gaussian type.

15. A method in accordance with claim 9 wherein the source images are in Bayer CFA format.

16. A system for combining digital images, comprising:
an image acquisition circuit operable to acquire at least two images at two different exposure levels, each image comprising a plurality of pixels; and
a fusion circuit operable to combine the at least two images by:
determining an initial weighting coefficient for each pixel of each acquired image,
determining a grid location for each pixel within a subset of pixels distributed in a substantially uniform manner over each acquired image;
attenuating large variations among the initial weighting coefficients of the pixels in the subset of pixels to obtain a filtered weighting coefficient for each pixel within the subset;
expanding the filtered weighting coefficients of the pixels in the subset of pixels by means of interpolation to obtain estimated filtered weighting coefficients for each pixel not in the subset of pixels; and
constructing a final image wherein each pixel of the final image is a linear combination of the initial weighting coefficient and the filtered weighting coefficient for each pixel in the aquired images.

17. The system of claim 16 wherein the weighted average of each pixel in the final image is calculated in accordance with the weighting function:

$$\overline{p_f}(x, y) = \frac{\sum_{i=1}^{n} w_i(x, y)\overline{p_i}(x, y)}{\sum_{i=1}^{n} w_i(x, y)}$$

where $\overline{p_f}(x,y)$ is the pixel having the coordinates (x, y), $\overline{p_1}(x,y), \ldots, \overline{p_n}(x,y)$ are the corresponding pixels forming part, respectively, of the source images 1, ..., n, and $w_1(x,y), \ldots, w_n(x,y)$ are the weighting coefficients associated, respectively, with the said pixels.

18. The system of claim 16 wherein the initial weighting coefficient is based on a weighting function that attributes weighting coefficients close to the minimum coefficient to digital values close or equal to the extremes of the range of possible digital values and gradually larger weighting coefficients to digital values forming part of the central regions of the range of possible digital values.

19. The system of claim 16, further comprising an alignment block operable to align the at least two image acquired by the acquisition block.

20. The system of claim 16, further comprising an image processing block operable to process the final image into an image format.

21. The system of claim 20 wherein the image format is Color Filter Array.

22. The system of claim 16 wherein the image acquisition block comprises an optical sensor having photosensitive elements associated with filter elements arranged in a Bayer pattern.

23. The system of claim 16, further comprising a scene judgment block operable to determine whether the plurality of images is to be combined.

24. The system of claim 16 wherein the initial weighting function is the same for all the source images.

25. The system of claim 16 wherein the initial weighting function is of the Gaussian type.

26. The system of claim 16 wherein the initial weighting function is of the triangular type.

27. The system of claim 16 wherein the at least two images acquired are images of the same scene.

* * * * *